United States Patent Office 3,753,922
Patented Aug. 21, 1973

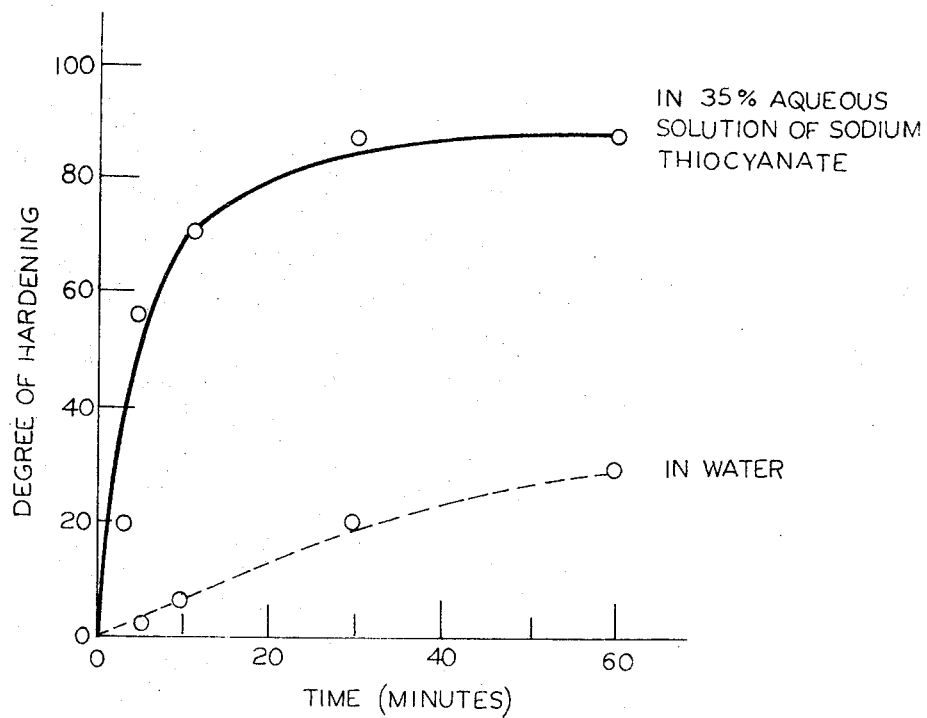

3,753,922
PRODUCTION OF MICROCAPSULES
Yukio Shimosaka and Hiroshi Suzuki, Saidaiji, Japan, assignors to Japan Exlan Company Limited
Filed Oct. 1, 1971, Ser. No. 185,659
Claims priority, application Japan, Oct. 6, 1970, 45/87,771
Int. Cl. B01j 13/02; B44d 1/02
U.S. Cl. 252—316                                       3 Claims

ABSTRACT OF THE DISCLOSURE

Microcapsules are formed by dispersing a hydrophobic material, such as an ink, in an aqueous solution of a thiocyanate containing a gellable hydrophilic colloid material, such as a protein, dissolved therein. The use of the thiocyanate hastens hardening of the capsules and prevents generation of bubbles and cohesion of the microcapsules.

---

This invention relates to a process for producing microcapsules by coacervation and more particularly to a process for producing microcapsules, in a hydrophilic liquid, by forming a film of a gelled hydrophilic colloid material around droplets of a hydrophobic material, dispersed in fine particles in the hydrophilic liquid, as a nucleus material and then hardening said film or by forming a hardened film of the gelled hydrophilic colloid material directly around the droplets of the nucleus material characterized in that the said hydrophilic liquid is an aqueous solution of a thiocyanate in which a gellable hydrophilic colloid material has been dissolved, so that the reaction of hardening the film of the gelled hydrophilic colloid material is proceeded quickly, the diameter of the resulting microcapsule is reduced, the cohesion of the produced microcapsules is prevented and the bubble formation in the course of the microcapsulation is decreased.

Generally microcapsules can be made by coacervation reported in detail by Bungenberg de Jong, H. R. Kruyt et al. in pages 232 to 480, Colloid Science, vol. 2 (1949). Thus microcapsules may be made by a salt-coacervation process wherein a neutral salt is added to such gellable colloid sol as gelatin or agar or by a complex-coacervation process which is carried out by diluting with water a mixed sol of at least two kinds of colloids which have opposite electric charges and one kind of which can be gelled or by adjusting the pH of such mixed sol. As for more details about these methods, reference may be made to U.S. Pat. Nos. 2,800,457 and 2,800,458.

However, unless microcapsules made by such process are subjected to a hardening treatment, they will not be durable to practical uses. Therefore, it has been conventional that microscopic capsules (i.e. coacervates) made by coating a nucleus material with a film of a gelled hydrophilic colloid material are hardened with various hardening agents. Thus, such hardening agent is added to the coacervate while the capsule produced by the coacervation is in the form of a sol or after the capsule has been gelled and then the pH of the mixture is adjusted to harden the capsule. The adjustment of pH is so effected that the hardening agent used would be most reactive. In such case, the capsule, while being hardened, is unstable so that it has been usual to gradually harden the capsule by leaving the same for a long time under a mild condition below the normal temperature. However, it is well known that, in the production of such capsule, the necessity of leaving it at a low temperature for a long time in the hardening step causes a serious problem as concerns the quality stability and productivity of capsules. Further, there are such troubles giving undesirable influences to the produced capsules that, in the usual system for the production of microcapsules in water, foaming (bubble formation) is remarkable and fine capsules tend to cohere to each other to form large blocks.

We have found that, by carrying out the microcapsulation in an aqueous solution of a thiocyanate rather than in water which has conventionally been used, the hardening of capsules (coacervates) can proceed quickly and the generation of bubbles and the cohesion of the produced microcapsules can be prevented.

Therefore a principal object of the present invention is to advantageously produce microcapsules by a coacervation process.

Another object of the present invention is to carry out the formation of microcapsules in an aqueous solution of a thiocyanate, so that the foaming or bubble formation and the cohesion of produced microcapsules are prevented and the reaction of hardening coacervates can be made to proceed quickly.

Other objects of the present invention will be apparent from the following description.

The objects of this invention are attained according to the process of this invention for making microcapsules in a hydrophilic liquid by forming a film of a gelled hydrophilic colloid material around a hydrophobic material dispersed in fine particles as a nucleus material and then hardening said film or by forming a hardened film of the gelled hydrophilic colloid material directly around the nucleus material characterized in that said hydrophilic liquid is an aqueous solution of a thiocyanate in which a hydrophilic colloid material has been dissolved.

Thus, in the process of the present invention, the microcapsulation (the formation of hardened coacervates or the formation and hardening of coacervates) is carried out in an aqueous solution of a thiocyanate. According to this improved method the time required for the production of microcapsules is much shorter than the production of the same in water. Therefore, the process of the present invention enables high speed production of microcapsules and is very advantageous from the industrial point of view. Further, for example, in the case of encapsulating a nucleous material likely to deteriorate with the lapse of time, the process of the present invention is particularly useful.

Further, the microcapsules produced according to the present invention are small in diameter (less than about 30 microns) and are unlikely to cohere with each other so that the process of this invention can be applied to such field where fine microcapsules are required such as, for example, the introduction of a fiber modifier to be incorporated into fibers or of pressure-sensitive copying paper.

Further, when microcapsules are formed in an aqueous solution of a thiocyanate, foaming or bubble formation will be less than in the case of preparing them in water. Therefore, for those uses where defoaming is required (for example, the preparation of a spinning solution by using a liquid in which microcapsules which have just been prepared are dispersed), the process of the present invention is useful.

In carrying out the present invention, any suitable gellable hydrophilic colloid material which can be dissolved in an aqueous solution of a thiocyanate and can coat a nucleus material by coacervation may be used. Examples thereof are proteins such as gelatin, fibrinogen, casein, fish glue and albumin; synthetic polymers such as polyvinyl pyrrolidone, poly(N-methylol acrylamide) and polyvinyl alcohol; natural or partly processed colloid materials such as agar, pectine, starch, gum arabic, carboxymethyl cellulose, sodium alginate, and dextran sulfate; and synthetic polymers having acid groups such as vinyl methyl ether-maleic anhydride copolymers, ethylene-maleic anhydride copolymers and poly(acrylic acid)- naphthalene sulfonic acid-formalin condensates. A mixture of two or more of these materials may also be used. Generally, such gellable hydrophilic colloid material is used at a concentration of 0.1 to 20% in an aqueous solution of a thiocyanate.

As a hardening agent to be used to harden coacervates in the present invention, there can be used any of aldehydes such as formaldehyde, glyoxal and glutaraldehyde; polyfunctional epoxy compounds; ethyleneimine compounds; melamine-formaldehyde precondensates; N-methylol compounds; active vinyl compounds; cyclic acetal compounds; polyhydric alcohol-alkylsulfonates; ketones such as diacetyl, diphenyl and diketone; and carbodiimide compounds. Any other high molecular weight hardening agent or inorganic hardening agent may also be used. Generally, it is preferable to use such hardening agent in an amount of 1/10 to 10 times the weight of the gellable hydrophilic colloid material.

As a hydrophobic material which is to be used as a nucleus material in the present invention, there can be used any material which neither dissolves in nor reacts with an aqueous solution of a thiocyanate. The nucleus material may well be either liquid or solid. If desired, there can be used a mixture of two or more solids, mixture of two or more liquids or mixtures of solid and liquid. It is preferable to use such nucleus material in an amount 1 to 20 times the weight of the above mentioned gellable hydrophilic colloid material.

Particular examples of such hydrophobic materials are inks, pigments, perfumes, dyes, fuel, chemical reactants, fiber modifiers (for example, sanitating agent, flame-retardant, pearly pigment, luminous material, deodorant, softener or antistatic agent) and plastic modifiers (such as ultraviolet absorbing agent, antioxidant or reinforcing agent). However, the nucleus materials are not limited to these particular ones.

As for thiocyanates to be used in the present invention, there can be enumerated such thiocyanates of alkali metals as lithium thiocyanate, sodium thiocyanate and potassium thiocyanate; such thiocyanates of alkaline earth metals as calcium thiocyanate and magnesium thiocyanate and ammonium thiocyanate. One or more of these may be used. Particularly sodium thiocyanate is preferable.

The concentration of the aqueous solution of a thiocyanate may be from 5% by weight up to the saturation point in water. Particularly a concentration of 10 to 60% by weight is preferable.

Except for the novel feature of the invention, i.e. the use of an aqueous solution of a thiocyanate for the medium wherein the microcapsulation is conducted, the production and hardening of coacervates or the formation of hardened coacervated may be carried out in an ordinary known manner. Thus, for example, when the coacervation operation described in any of the above cited U.S. patents and Japanese patent publication No. 26,823/1964 is carried out in an aqueous solution of a thiocyanate, the effect of the present invention will be obtained and microcapsules having an excellent property will be produced advantageously.

It is exactly the same as conventional methods that the hardening reaction can be carried out by adding a hardening agent after or simultaneously with the production of coacervates.

The following examples illustrate the present invention. In these examples all percentages and parts are by weight unless otherwise specified.

REFERENCE EXAMPLE

A 37% aqueous solution of formaldehyde was added to 10 parts of an aqueous solution containing 3% polyvinyl alcohol (partially saponified product) in such an amount that the content of formaldehyde in the resulting solution is 0.5 part. Further an aqueous solution of hydrochloric acid was added thereto in such an amount that the content of hydrochloric acid is 1 part. The solution was agitated with a homomixer to formalize the polyvinyl alcohol.

On the other hand, to a 35% aqueous solution of sodium thiocyanate containing 3% of the above mentioned polyvinyl alcohol, formaldehyde and hydrochloric acid were added in the same manner as above to formalize the polyvinyl alcohol.

The relations between the time and degree of hardening in the above mentioned two kinds of formalizing reactions (i.e. hardening reactions) were determined and are shown in FIG. 1. The degree of hardening was determined by weight percent of the insoluble portion remaining after the formalized polyvinyl alcohol was washed with water (20° C.).

As apparent from the figure, the hardening reaction of the polyvinyl alcohol in the aqueous solution of sodium thiocyanate is much higher in velocity than the reaction in water. This fact clearly indicates that, in a process for producing microcapsules by forming a film of hardened polyvinyl alcohol, when the operation is carried out in an aqueous solution of sodium thiocyanate, the hardening reaction will be able to be concluded within a time shorter than in water.

EXAMPLE 1

5 parts of perfume (isoamyl salicylate) were added to a solution consisting of 3 parts of polyvinyl alcohol (partially saponified product) and 92 parts of 35% aqueous solution of sodium thiocyanate and the mixture was emulsified and dispersed by using a homomixer.

Then the polyvinyl alcohol was hardened at 50° C. by adding 3.3 parts of formaldehyde and 0.5 part of glyoxal as hardening agents to this dispersion and further adding 1 part of hydrochloric acid as a hardening catalyst, to encapsule the perfume droplets with the hardened polyvinyl alcohol (capsulating colloid material). The hardening reaction occurred as soon as the hydrochloric acid was added and immediately hardened microcapsules were produced. The diameter of the thus obtained microcapsules was less than 10 microns.

On the other hand, when the same procedure as above was repeated except that water was used instead of the aqueous solution of sodium thiocyanate, one hour was required for hardening. The diameter of the produced microcapsules reached a maximum of 60 microns.

EXAMPLE 2

10 parts of perfume (isoamyl salicylate) and 30 parts of a 35% aqueous solution of sodium thiocyanate containing 10% gelatin were mixed together. Then 30 parts of 35% aqueous solution of sodium thiocyanate containing 10% gum arabic were added to said mixture and 130 parts of 35% aqueous solution of sodium thiocyanate at 40° C. were gradually added to the mixture while being agitated at about 40° C. to prepare a dispersion in which the above mentioned perfume was finely dispersed in a continuous phase formed of the aqueous solution of sodium thiocyanate containing gelatin and gum arabic. Then 5% hydrochloric acid was dropped into said dispersion to adjust the pH to about 4 so that coacervates enclosing the above mentioned perfume droplets are produced. The product was cooled to 5° C., and then 1 part of a 35% aqueous solution of formaldehyde was added thereto and further 5% aqueous solution of sodium hydroxide was added thereto to increase the pH to 9. The coacervates were hardened and thus well hardened microcapsules (less than 10 microns) dispersed in the aqueous solution of sodium thiocyanate were obtained.

Then 1.7 or 9.9 parts of the aqueous solution of sodium thiocyanate containing the thus obtained microcapsules having a particle diameter of less than 10 microns were mixed respectively with 98.3 or 90.1 parts of an acrylic spinning solution prepared by dissolving 12 parts of an acrylonitrilemethyl acrylate copolymer (acrylonitrile content 90%) in 88 parts of a 44% aqueous solution of sodium thiocyanate. The mixed spinning solution was extruded into a coagulating bath consisting of 12% aqueous solution of sodium thiocyanate at −2° C. through a spinnerette of 50 orifices (orifice diameter 0.09 mm.) to form coagulated fibers. The fiber was then washed with water, stretched 10 times the length in boiling water and then wet-heat-relaxed at 125° C. to obtain an acrylic fiber of about 3 deniers containing 1.6 or 10.1% by volume of microcapsules enclosing the above mentioned perfume.

In each of the thus obtained two kinds of acrylic fibers, the smell of the introduced perfume was retained and did not vanish even after one month. Further, in case said two kinds of fibers were heated on a heater or in boiling water, a strong smell could be obtained.

On the other hand, when microcapsules were made in the same manner as above except that water was used instead of the 35% aqueous solution of sodium thiocyanate, the hardening of the coacervates was less complete and the maximum diameter of the resulting microcapsules was as large as 60 microns. Further, when an acrylic spinning solution was prepared by adding sodium thiocyanate and the above described acrylonitrile copolymer into an aqueous solution of the obtained microcapsules, foaming was so severe that it was difficult to defoam said spinning solution. When the spinning solution was spun by the above described process, the filter was clogged with the microcapsules and the fiber spinnability of the solution was remarkably low.

EXAMPLE 3

10 parts of liquid fire-retardant, i.e. tris(2,3-dibromopropyl)phosphate were dispersed in 100 parts of a 45% aqueous solution of sodium thiocyanate containing 1% of polyvinyl alcohol. Then 0.5 part of a melamine-formaldehyde precondensate (hardening agent) and 0.075 part of an organic amine salt type hardening catalyst were added at 45° C. to the dispersion to obtain microcapsules having the hardened polyvinyl alcohol as a coating layer and containing the above mentioned fire-retardant as an enclosed material. The dispersibility of the resulting microcapsules in the aqueous solution of sodium thiocyanate was high so that substantially no cohesion of the particles with each other was noticed.

EXAMPLE 4

1 part of a 37% aqueous solution of formaldehyde and 0.1 part of glyoxal were added as hardening agents to a dispersion obtained by adding 10 parts of titanium oxide to a mixed solution of 99 parts of a 45% aqueous solution of sodium thiocyanate and 1 part of polyvinyl alcohol and agitating the mixture at a high speed. Further 0.1 part of zinc chloride was added as a hardening catalyst to the mixture to obtain microcapsules enclosing titanium oxide particles.

The thus obtained microcapsules were finely dispersed without cohering at all in the aqueous solution of sodium thiocyanate and no foaming or bubble formation was observed even during the capsulating process.

What we claim is:

1. In a process for producing microcapsules by forming a film of a gelled hydrophilic colloid material around a hydrophobic material dispersed in a hydrophilic liquid in fine particles as a nucleus material and hardening the film, or by forming a hardened film of the gelled hydrophilic colloid material directly around the hydrophobic nucleus material in a hydrophilic liquid, the improvement wherein the hydrophilic liquid is an aqueous solution of a thiocyanate in which a gellable hydrophilic colloid material has been dissolved, the aqueous solution containing 10–60% by weight of the thiocyanate.

2. A process as claimed in claim 1 wherein said thiocyanate is sodium thiocyanate.

3. A process as claimed in claim 1 wherein said hydrophilic liquid is an aqueous solution of a thiocyanate in which polyvinyl alcohol has been dissolved.

References Cited
UNITED STATES PATENTS

| | | | |
|---|---|---|---|
| 3,043,782 | 7/1962 | Jensen | 252—316 |
| 3,455,848 | 7/1969 | Yoncoskie et al. | 252—316 X |

RICHARD D. LOVERING, Primary Examiner

U.S. Cl. X.R.

106—300, 308 M; 117—62.2, 100 A, 100 B; 252—8.1, 522; 264—4; 424—33, 34, 35, 36, 37